(12) United States Patent
Yamauchi et al.

(10) Patent No.: US 11,785,168 B2
(45) Date of Patent: Oct. 10, 2023

(54) INFORMATION PROCESSING APPARATUS AND NON-TRANSITORY COMPUTER READABLE MEDIUM FOR AUTOMATIC RETOUCHING BY REPLACING MAGENTA WITH PINK AFTER CMYK CONVERSION

(71) Applicant: FUJIFILM BUSINESS INNOVATION CORP., Tokyo (JP)

(72) Inventors: Kaoru Yamauchi, Kanagawa (JP); Masahiko Kubo, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 83 days.

(21) Appl. No.: 17/412,845

(22) Filed: Aug. 26, 2021

(65) Prior Publication Data
US 2022/0377205 A1     Nov. 24, 2022

(30) Foreign Application Priority Data
May 20, 2021   (JP) ................................ 2021-085594

(51) Int. Cl.
*H04N 1/60*     (2006.01)
(52) U.S. Cl.
CPC ................................. *H04N 1/6002* (2013.01)
(58) Field of Classification Search
None
See application file for complete search history.

(56) References Cited

U.S. PATENT DOCUMENTS

| 2005/0259285 A1* | 11/2005 | Shoki | H04N 1/6016 |
| | | | 358/1.9 |
| 2016/0344901 A1* | 11/2016 | Awamura | H04N 1/54 |
| 2022/0250395 A1* | 8/2022 | Tsuchiya | C09D 11/50 |

FOREIGN PATENT DOCUMENTS

| JP | 2001-298629 A | 10/2001 |
| JP | 2005-252323 A | 9/2005 |
| JP | 2006-173824 A | 6/2006 |

* cited by examiner

*Primary Examiner* — Barbara D Reinier
(74) *Attorney, Agent, or Firm* — Oliff PLC

(57) ABSTRACT

An information processing apparatus includes a processor configured to: receive an image; and in response to inputting a magenta component resulting from CMYK conversion of the received image, output the image having undergone color conversion performed by using a profile in which at least one of the magenta component and a pink component that leads to fluorescent color forming is output, in which in an area having an input magenta amount lower than a predetermined threshold, the magenta component is not output and only the pink component is output, the input magenta amount serving as an amount of the magenta component resulting from the CMYK conversion, and in which in an area having the input magenta amount higher than or equal to the threshold, the magenta component and the pink component are output.

20 Claims, 3 Drawing Sheets

INFORMATION PROCESSING APPARATUS AND NON-TRANSITORY COMPUTER READABLE MEDIUM FOR AUTOMATIC RETOUCHING BY REPLACING MAGENTA WITH PINK AFTER CMYK CONVERSION

CROSS-REFERENCE TO RELATED APPLICATIONS

This application is based on and claims priority under 35 USC 119 from Japanese Patent Application No. 2021-085594 filed May 20, 2021.

BACKGROUND

(i) Technical Field

The present disclosure relates to an information processing apparatus and a non-transitory computer readable medium.

(ii) Related Art

Japanese Unexamined Patent Application Publication No. 2005-252323 discloses a color image forming apparatus including an image forming unit that forms an image by using at least one pair of dark and light color materials of similar colors. The color image forming apparatus also includes a first color separation unit and a second color separation unit each of which converts image signal components formed from the color component of the dark color material to image signal components of the dark and light color materials of the similar colors. The first and second color separation units each refer to a look up table (LUT) on the basis of an input signal and calculates image signal values for the dark and light color materials by the interpolation of the LUT thus referred to. The signal input to the first color separation unit is a red, green, and blue (RGB) signal, and the signal input to the second color separation unit is a cyan, magenta, yellow, and black (CMYK) signal. The first and second color separation units perform the color separation on image signals in colorimetrically the same color space, the image signals including the respective image signals corresponding to the dark and light color materials.

Japanese Unexamined Patent Application Publication No. 2006-173824 discloses an image processing apparatus including an image input unit that inputs an image, a flesh area determination unit that determines whether the input image has a flesh area, and a LUT selection unit that selects a LUT on the basis of the result of the determination by the flesh area determination unit. The image processing apparatus further includes a color conversion unit and an image output unit. The color conversion unit converts a color of the input image by using the LUT selected by the LUT selection unit, and the image output unit outputs an image having undergone the color conversion by the color conversion unit.

Japanese Unexamined Patent Application Publication No. 2001-298629 discloses an image processing apparatus including an input unit that inputs a correction condition for a specific color and a setting unit that sets a correction condition for a different specific color on the basis of the input correction condition. The image processing apparatus further includes a correction unit that corrects each of the specific color and the different specific color on the basis of a corresponding one of the input correction condition and the set correction condition.

SUMMARY

To date, to express flesh representing a skin part of an image of a person and expressed by using yellow and magenta, retouching is manually performed in a comic, a coterie magazine, or other books. Retouching is processing for replacing magenta in the skin part with pink. However, it is not possible for a user other than a designer to perform retouching.

Aspects of non-limiting embodiments of the present disclosure relate to image representation enabled without manual retouching in replacement of magenta with pink after CMYK conversion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive an image; and in response to inputting a magenta component resulting from CMYK conversion of the received image, output the image having undergone color conversion performed by using a profile in which at least one of the magenta component and a pink component that leads to fluorescent color forming is output, in which in an area having an input magenta amount lower than a predetermined threshold, the magenta component is not output and only the pink component is output, the input magenta amount serving as an amount of the magenta component resulting from the CMYK conversion, and in which in an area having the input magenta amount higher than or equal to the threshold, the magenta component and the pink component are output.

BRIEF DESCRIPTION OF THE DRAWINGS

An exemplary embodiment of the present disclosure will be described in detail based on the following figures, wherein.

DETAILED DESCRIPTION

Figure 1:
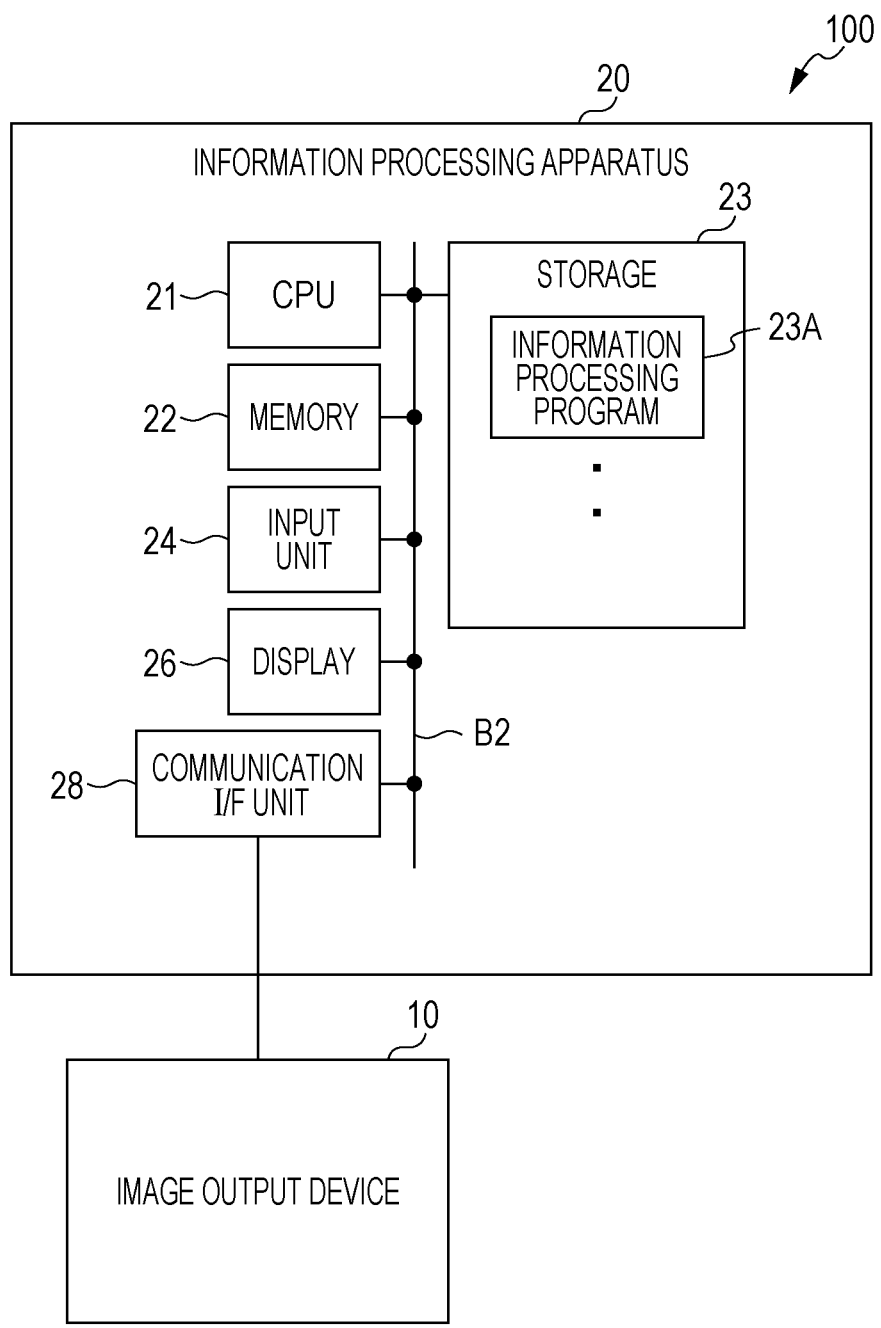
FIG. 1 is a schematic diagram illustrating an example hardware configuration of an information processing system according to an exemplary embodiment.

Hereinafter, an example of an exemplary embodiment of this disclosure will be described with reference to the drawings. Note that the same or equivalent components and parts are denoted by the same reference numerals throughout the drawings. In addition, the ratios of dimensions of the drawings are exaggerated for convenience of explanation and are different from actual ratios on occasions.

As illustrated in FIG. 1, an information processing system 100 according to this exemplary embodiment includes an image output device 10 and an information processing apparatus 20.

In this exemplary embodiment, a digital multifunctional printer having an image printing function, an image transmission function, and other functions is applied to the image output device 10. However, an image output device or other devices having only one of these functions may be applied to the image output device 10.

The hardware configuration of the information processing apparatus 20 according to this exemplary embodiment will be described. In this exemplary embodiment, a personal computer is applied to the information processing apparatus 20. However, any information processing apparatus such as a server computer may be applied to the information processing apparatus 20. The information processing apparatus 20 according to this exemplary embodiment includes a central processing unit (CPU) 21, a memory 22 serving as a temporary memory area, a nonvolatile storage 23, an input unit 24, a display 26, and a communication interface (I/F) unit 28. The components are connected to each other via a bus B2.

The storage 23 is implemented by a storage device such as a hard disk drive (HDD), a solid state drive (SSD), or a flash memory. The storage 23 serving as a storage medium stores an information processing program 23A. The CPU 21 reads out the information processing program 23A from the storage 23, loads the information processing program 23A into the memory 22, and serially executes processes of the information processing program 23A.

The input unit 24 includes a pointing device such as a mouse and a keyboard and is used to receive various pieces of input information.

The display 26 is, for example, a liquid crystal display and displays various pieces of information. The display 26 may use a touch panel system and thereby function as the input unit 24.

The communication I/F unit 28 is an interface for the information processing apparatus 20 to communicate with an external apparatus such as the image output device 10. A wired communication standard such as Ethernet (registered trademark) or Fiber Distributed Data Interface (FDDI) is used for the communications.

Figure 2:
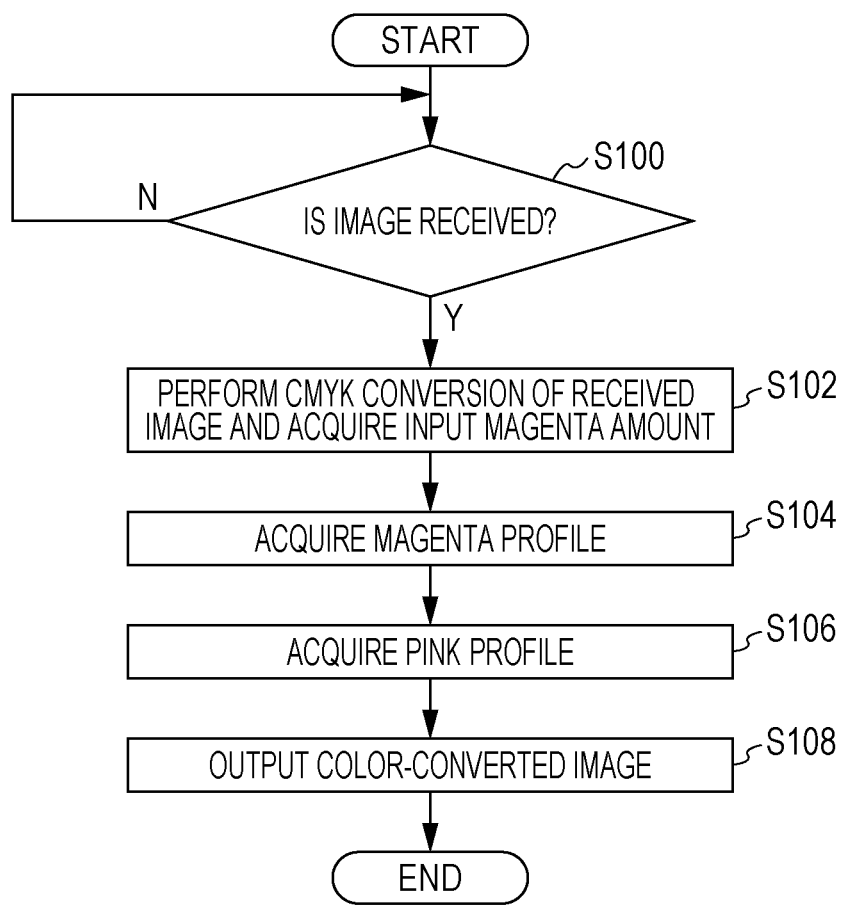
FIG. 2 is a flowchart illustrating an example of information processing according to the exemplary embodiment.

Actions of the information processing apparatus 20 according to this exemplary embodiment will be described with reference to FIGS. 2 and 3. In response to a user giving an instruction to start the information processing program 23A by using the input unit 24, the CPU 21 runs the information processing program 23A, and thereby information processing illustrated in FIG. 2 is performed.

In step S100, the CPU 21 waits until an image is received. The image received by the CPU 21 in this step is hereinafter referred to as a received image.

In step S102, the CPU 21 performs CMYK conversion on the received image and acquires an input magenta amount serving as the amount of a magenta component after the CMYK conversion.

In step S104, the CPU 21 acquires information regarding a magenta profile from the storage 23. The magenta profile represents a magenta toner amount serving as the amount of the magenta component to be output on the basis of the input magenta amount.

In step S106, the CPU 21 acquires information regarding a pink profile from the storage 23. The pink profile represents a pink toner amount serving as the amount of a leading to fluorescent color forming (hereinafter, simply referred to as a pink component) to be output on the basis of the input magenta amount. When being added to a cyan component, the magenta component, a yellow component, and a black component, the pink component thereby extends a color gamut represented by the cyan component, the magenta component, the yellow component, and the black component.

The information regarding the magenta profile and the information regarding the pink profile acquired by the CPU 21 in steps S104 and S106 will be described by using FIG. 3 later.

In step S108, the CPU 21 performs color conversion of the received image by using the profiles acquired in steps S104 and S106. The CPU 21 then outputs, to the image output device 10, a color-converted image having undergone the color conversion and terminates this information processing.

Figure 3:
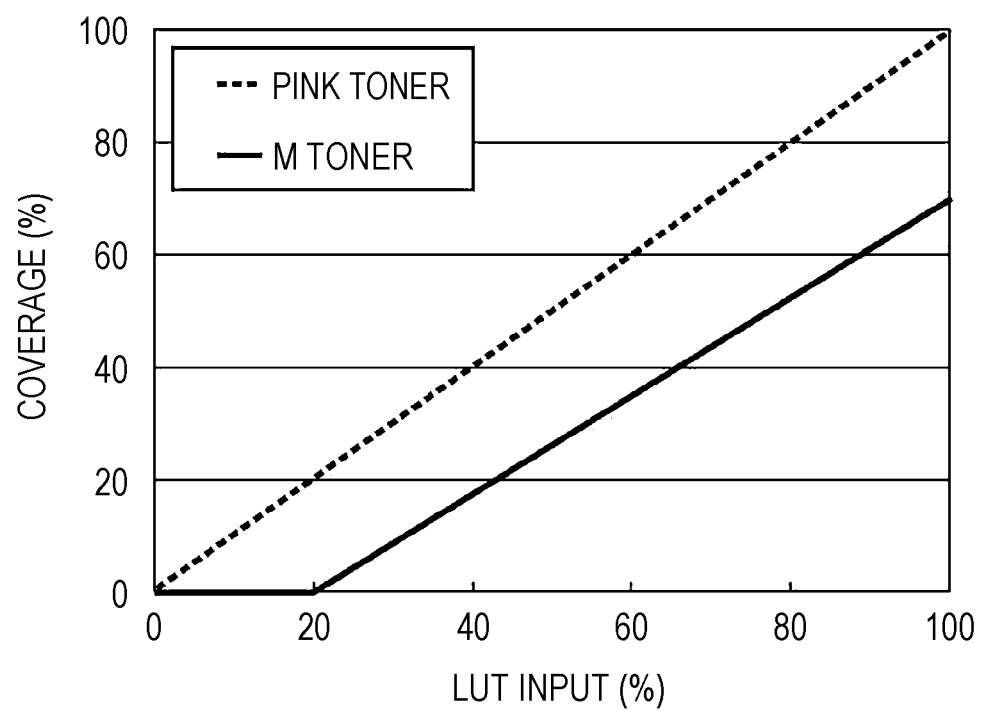
FIG. 3 is a graph illustrating an example of a pink profile and a magenta profile according to the exemplary embodiment.

FIG. 3 is a graph illustrating an example of the information regarding the magenta profile and the information regarding the pink profile that are stored in the storage 23. In the graph, the vertical axis represents the pink toner amount and the magenta toner amount (M toner in the example illustrated in FIG. 3), and the horizontal axis represents the input magenta amount (LUT input in the example illustrated in FIG. 3). In the graph, a dotted line represents the pink profile, and a solid line represents the magenta profile. As illustrated in FIG. 3, in the magenta profile, the magenta component is not output in an area having the input magenta amount lower than 20%; however, in the pink profile, the pink component is output even in the area.

In contrast, in an area having the input magenta amount higher than or equal to 20%, the magenta component is output in the magenta profile, and the magenta toner amount is increased with the increase of the input magenta amount. The pink toner amount is also increased in the pink profile with the increase of the input magenta amount. In the area, the input magenta amount is thus proportional to the pink toner amount, and the input magenta amount is proportional to the magenta toner amount. In the area in the pink profile, the pink component is output such that the pink toner amount is higher than the magenta toner amount any time.

In addition, in the area, the magenta toner amount increased with the increase of the input magenta amount is lower than the pink toner amount increased with the increase of the input magenta amount. Accordingly, in the area, a difference between the pink toner amount and the magenta toner amount is increased with the increase of the input magenta amount. However, the difference between the pink toner amount and the magenta toner amount may also be a predetermined fixed amount (for example, 30%). In addition, a difference between the increased pink toner amount and the increased magenta toner amount is an amount lower than the difference between the pink toner amount and the magenta toner amount.

As illustrated in FIG. 3, in the pink profile, the pink component is output any time such that the pink toner amount is increased with the increase of the input magenta amount. At this time, a difference between the input magenta amount and the pink toner amount takes on a value lower than the value of the difference between the pink toner amount and the magenta toner amount in the area having the input magenta amount higher than or equal to 20%. Note that as illustrated in FIG. 3, the difference between the input magenta amount and the pink toner amount may be zero, in other words, the input magenta amount and the pink toner amount may have the same value.

In the example illustrated in FIG. 3, the upper limit of each of the pink toner amount and the magenta toner amount is 100%. However, the upper limit may be higher than 100%. An input magenta amount threshold for determining whether to output the magenta component in the magenta profile may be any value within a range from a value a predetermined amount higher than the 20% amount to a value a predetermined amount lower than the 20% amount.

The exemplary embodiment has heretofore been described; however, the technical scope of the present disclosure is not limited to the scope described in the exemplary embodiment above. Various modifications or improvements may be made to the exemplary embodiment described above without departing from the spirit of the disclosure. An exemplary embodiment to which the modification or the improvement is made may also be included in the technical scope of the present disclosure.

The exemplary embodiment does not limit the disclosure to the claims. Not all of the combinations of the features described in the exemplary embodiment are requisite for the solutions in the disclosure. The above-described exemplary embodiment includes the disclosure at various stages, and various disclosures are extracted by combining multiple disclosed components. Even if part of the components described in the exemplary embodiment is deleted, a configuration in which the part of the components is deleted may be extracted as a disclosure as long as effects thereof are exerted.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The case where the information processing program 23A is installed in the storage 23 has been described in this exemplary embodiment; however, the exemplary embodiment is not limited to this case. The information processing program 23A according to this exemplary embodiment may be provided in such a manner as to be stored in a computer-readable storage medium. For example, the information processing program 23A according to this exemplary embodiment may be provided in such a manner as to be recorded in an optical disk such as a compact disc read-only memory (CD-ROM) or a digital versatile disc (DVD)-ROM or in a semiconductor memory such as a universal serial bus (USB) memory or a memory card. In addition, the information processing program 23A according to this exemplary embodiment may be acquired from an external apparatus via the communication I/F unit 28.

The case where the information processing is implemented by running a program and by a software configuration using a computer has heretofore been described in the exemplary embodiment above; however, the present disclosure is not limited to this case. For example, the information processing may be implemented by a hardware configuration or combination of the hardware configuration and the software configuration.

The configuration of the information processing apparatus 20 described in the exemplary embodiment above is an example. It goes without saying that a deletion of an unnecessary part and an addition of a new part may be made without departing from the spirit of the present disclosure.

The processing flow of the information processing program described in the exemplary embodiment above (see FIG. 2) is also an example. It goes without saying that a deletion of an unnecessary step, an addition of a new step, and a change of the order of the process steps may be made without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
 a processor configured to:
  receive an image;
  obtain an amount of a magenta component resulting from CMYK conversion of the received image, the obtained amount of the magenta component being an input magenta amount; and
  perform color conversion in the image by using a profile in which at least one of the magenta component and a pink component that leads to fluorescent color forming is output, the color conversion being performed by:
   not outputting the magenta component and outputting instead the pink component in an area of the image having the input magenta amount lower than a predetermined threshold, and
   outputting both the magenta component and the pink component in an area of the image having the input magenta amount higher than or equal to the predetermined threshold.

2. The information processing apparatus according to claim 1,
 wherein the processor is configured to output the image having undergone the color conversion performed by using the profile in which an output amount of the pink component is increased with increase of the input magenta amount.

3. The information processing apparatus according to claim 2,
 wherein the processor is configured to output the image having undergone the color conversion performed by using the profile in which in the area having the input magenta amount higher than or equal to the predetermined threshold, the magenta component and the pink component are output and an output amount of the magenta component and the output amount of the pink component are increased with the increase of the input magenta amount.

4. The information processing apparatus according to claim 1,
 wherein the processor is configured to output the image having undergone the color conversion performed by using the profile in which in the area having the input magenta amount higher than or equal to the predetermined threshold, the magenta component and the pink component are output and a difference between an output amount of the pink component and an output amount of the magenta component is a predetermined difference amount.

5. The information processing apparatus according to claim 2,
wherein the processor is configured to output the image having undergone the color conversion performed by using the profile in which in the area having the input magenta amount higher than or equal to the predetermined threshold, the magenta component and the pink component are output and a difference between the output amount of the pink component and an output amount of the magenta component is a predetermined difference amount.

6. The information processing apparatus according to claim 3,
wherein the processor is configured to output the image having undergone the color conversion performed by using the profile in which in the area having the input magenta amount higher than or equal to the predetermined threshold, the magenta component and the pink component are output and a difference between the output amount of the pink component and the output amount of the magenta component is a predetermined difference amount.

7. The information processing apparatus according to claim 4,
wherein the processor is configured to output the image having undergone the color conversion performed by using the profile in which a difference between the input magenta amount and the output amount of the pink component is an amount lower than the predetermined difference amount regardless of the input magenta amount.

8. The information processing apparatus according to claim 5,
wherein the processor is configured to output the image having undergone the color conversion performed by using the profile in which a difference between the input magenta amount and the output amount of the pink component is an amount lower than the predetermined difference amount regardless of the input magenta amount.

9. The information processing apparatus according to claim 6,
wherein the processor is configured to output the image having undergone the color conversion performed by using the profile in which a difference between the input magenta amount and the output amount of the pink component is an amount lower than the predetermined difference amount regardless of the input magenta amount.

10. The information processing apparatus according to claim 4,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with increase of the input magenta amount, the output amount of the pink component being increased with the increase of the input magenta amount.

11. The information processing apparatus according to claim 5,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with the increase of the input magenta amount, the output amount of the pink component being increased with the increase of the input magenta amount.

12. The information processing apparatus according to claim 6,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with the increase of the input magenta amount, the output amount of the pink component being increased with the increase of the input magenta amount.

13. The information processing apparatus according to claim 7,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with the increase of the input magenta amount, the output amount of the pink component being increased with the increase of the input magenta amount.

14. The information processing apparatus according to claim 8,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with the increase of the input magenta amount, the output amount of the pink component being increased with the increase of the input magenta amount.

15. The information processing apparatus according to claim 9,
wherein the processor is configured to output the image having undergone the color conversion performed by using the profile in which in the area having the input magenta amount higher than or equal to the predetermined threshold, the difference between the output amount of the magenta component and the output amount of the pink component is an amount lower than the predetermined difference amount, the output amount of the magenta component being increased with the increase of the input magenta amount, the output amount of the pink component being increased with the increase of the input magenta amount.

16. The information processing apparatus according to claim 1,
wherein the processor is configured to output the image having undergone the color conversion performed by using the profile in which in the area having the input magenta amount higher than or equal to the predetermined threshold, an output amount of the pink component is higher than an output amount of the magenta component any time.

17. The information processing apparatus according to claim 2,
wherein the processor is configured to output the image having undergone the color conversion performed by using the profile in which in the area having the input magenta amount higher than or equal to the predetermined threshold, the output amount of the pink component is higher than an output amount of the magenta component any time.

18. The information processing apparatus according to claim 1,
wherein the predetermined threshold is 20.

19. The information processing apparatus according to claim 7,
wherein the processor is configured to output the image having undergone the color conversion performed by using the profile in which the difference between the input magenta amount and the output amount of the pink component is zero regardless of the input magenta amount.

20. A non-transitory computer readable medium storing a program causing a computer to execute a process for information processing, the process comprising:
receiving an image;
obtaining an amount of a magenta component resulting from CMYK conversion of the received image, the obtained amount of the magenta component being an input magenta amount; and
performing color conversion in the image by using a profile in which at least one of the magenta component and a pink component that leads to fluorescent color forming is output, the color conversion being performed by:
not outputting the magenta component and outputting instead the pink component in an area of the image having the input magenta amount lower than a predetermined threshold, and
outputting both the magenta component and the pink component in an area of the image having the input magenta amount higher than or equal to the predetermined threshold.

\* \* \* \* \*